(12) United States Patent
Barber et al.

(10) Patent No.: US 7,702,679 B2
(45) Date of Patent: Apr. 20, 2010

(54) METHOD FOR CREATING AND TRACKING EXTERNAL SYSTEM DATA VIA A MIND MAP

(75) Inventors: Richard Barber, Berkeley, CA (US); Michael S. Scherotter, Fairfax, CA (US)

(73) Assignee: Mindjet LLC, San Francisco, CA (US)

( * ) Notice: Subject to any disclaimer, the term of this patent is extended or adjusted under 35 U.S.C. 154(b) by 259 days.

(21) Appl. No.: 11/710,204

(22) Filed: Feb. 23, 2007

(65) Prior Publication Data

US 2008/0208885 A1    Aug. 28, 2008

(51) Int. Cl.
*G06F 17/30* (2006.01)
(52) U.S. Cl. .................................... 707/736; 707/602
(58) Field of Classification Search ................ 707/1, 707/100, 102, 103 Y, 103 Z, 104.1; 715/751
See application file for complete search history.

(56) References Cited

U.S. PATENT DOCUMENTS

| | | | |
|---|---|---|---|
| 7,313,766 B2* | 12/2007 | Kautto Kiovula et al. | 715/853 |
| 2003/0083922 A1* | 5/2003 | Reed | 705/9 |
| 2003/0110253 A1* | 6/2003 | Anuszczyk et al. | 709/224 |
| 2003/0233631 A1* | 12/2003 | Curry et al. | 717/100 |
| 2005/0132305 A1* | 6/2005 | Guichard et al. | 715/855 |
| 2005/0147950 A1* | 7/2005 | Ortiz et al. | 434/238 |
| 2006/0005164 A1* | 1/2006 | Jetter et al. | 717/113 |
| 2008/0001948 A1* | 1/2008 | Hirsch | 345/440 |

OTHER PUBLICATIONS

"Mindjet MindManager 6 User's Guide" [Online} 2005, XP-002481935. Retrieved from the Internet: URL: http://www.mindjet.com/pdf-eng/MindManager_6_Help_Guide.pdf, pp. 4, 177-180.
Spanger, S. et al, "Mindmap: Utilizing Multiple Taxonomies and Visualization to Understand a Document Collection," Proceedings of the 35th Annual Hawaii International . . . , 2001.
PCT Search Report and Written Opinion in corresponding PCT Application No. PCT/US2008/002340.

* cited by examiner

*Primary Examiner*—Cam-Linh Nguyen
(74) *Attorney, Agent, or Firm*—Tina Lessani; Lessani & Lessani LLP

(57) ABSTRACT

A mind mapping system uploads mind map data to an external system and tracks changes to such data in the external system through the mind map. The invention enables a user to create data objects in an external system through the mind map by classifying topics in a mind map, where the mind map is generated through a mind mapping system. The mind mapping system presents the user with classification categories that correspond to data types in the external system. By classifying a topic in accordance with such classification categories, a user is essentially mapping the topic to a data type in the external system. The mind mapping system interfaces with the external system to upload data in classified topics to the external system. At a later point, the user can then track any changes made to the data in the external system through the mind map.

34 Claims, 17 Drawing Sheets

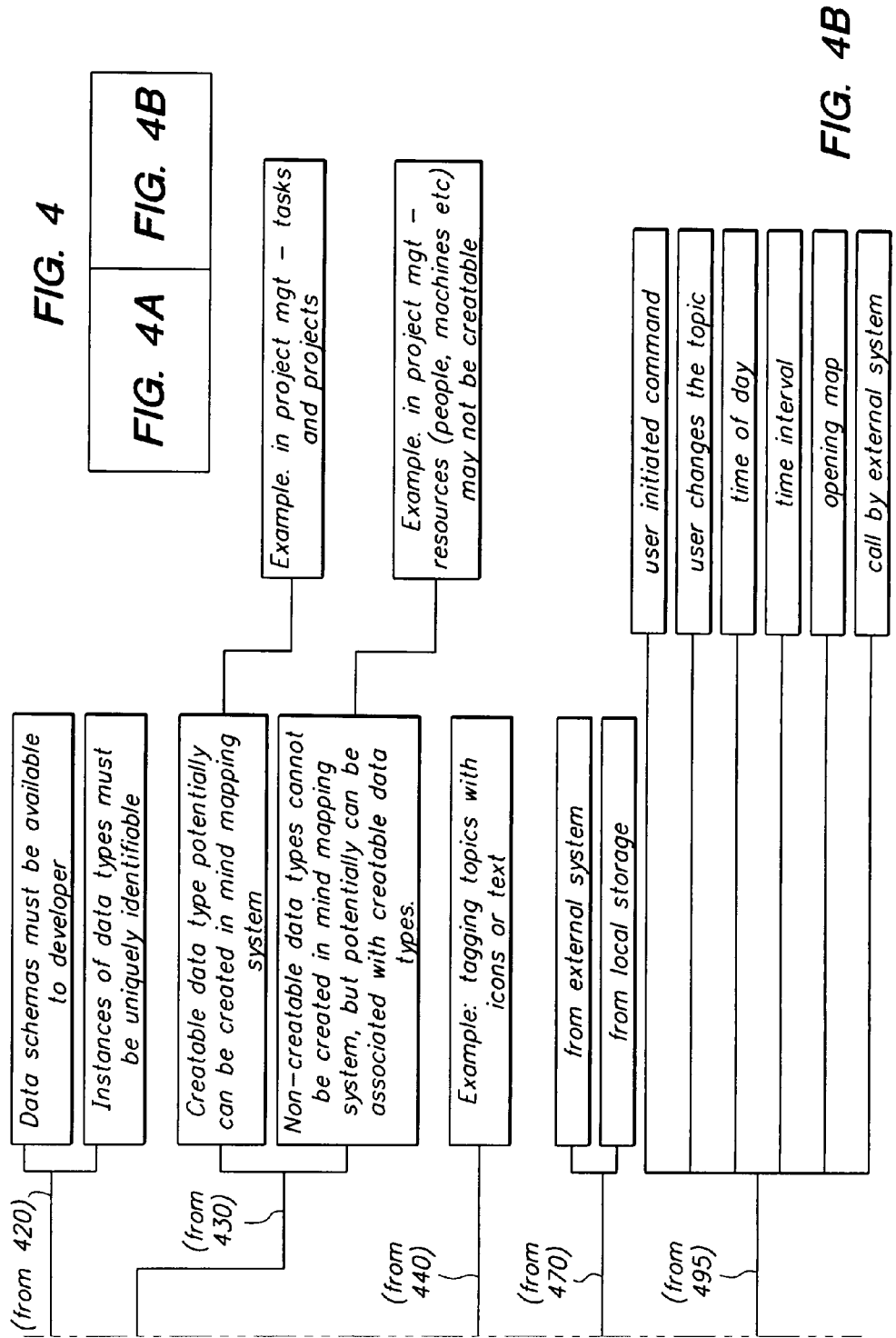

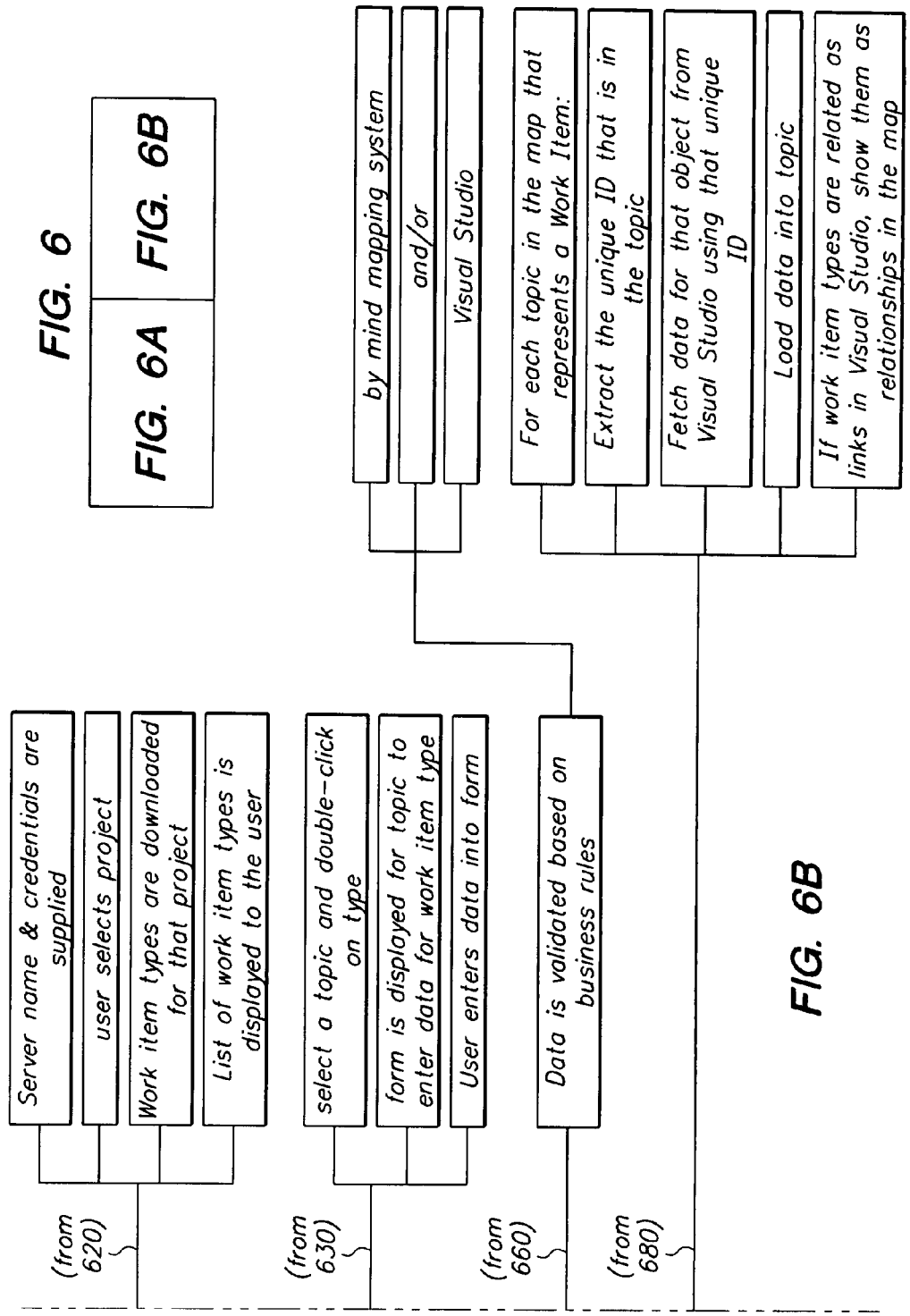

METHOD FOR CREATING AND TRACKING EXTERNAL SYSTEM DATA VIA A MIND MAP

BACKGROUND OF THE INVENTION

1. Field of the Invention

This invention relates generally to mind mapping systems, and, more particularly, to a method for creating and tracking external system data via a mind map.

2. Description of the Background Art

A mind map is a diagram that represents ideas and/or information around a central topic. Mind maps are increasingly used to help people generate, classify, and/or organize ideas and information and to see such ideas and information in a hierarchical, visual layout. Mind maps are made up of hierarchically-arranged "topics."

There are software programs that enable people to easily create mind maps. Mindjet, Inc.'s Mind Manager software is an example of such software.

One of the most common uses of mind mapping software is in group meetings for planning projects, tasks, processes, etc. FIG. 8 is an example of a mind map that organizes information and ideas related to a website update project. A group may use mind mapping software to organize data related to a project task, or process, and, subsequently, an individual often will manually enter data from the map into a separate project management, requirements management (e.g., Microsoft Visual Studio Team System, Telelogic Doors), workflow management (e.g., CRM systems, Oracle Workflow), and business process modeling software system. As entering data manually into such systems can be tedious, it is desirable to have mind mapping software that can interface with such systems in order to upload data from a mind map to such systems. Moreover, if changes are made to the data in such systems, it is desirable to update the mind map with such changes. This would allow a person managing a project, task, or process to easily track the status of the project, task, or process through the mind map.

SUMMARY

The present invention provides a system and method for uploading mind map data to an external system and tracking changes to such data in the external system through the mind map. The invention enables a user to create data objects in an external system through a mind map by classifying topics in the mind map, where the mind map is generated through a mind mapping system.

The mind mapping system presents the user with classification categories that correspond to data types in the external system. By classifying a topic in accordance with such classification categories, a user is essentially mapping the topic to a data type in the external system. The mind mapping system interfaces with the external system to upload data in classified topics to the external system.

At a later point, the user can then track any changes made to the data in the external system through the mind map. Specifically, at the user's request or upon another trigger event (e.g., user opens map), the mind mapping system (in one embodiment) queries the external system for any updates to data objects in the external system that were created through the mind map.

DETAILED DESCRIPTION OF THE PREFERRED EMBODIMENTS

Figure 1:
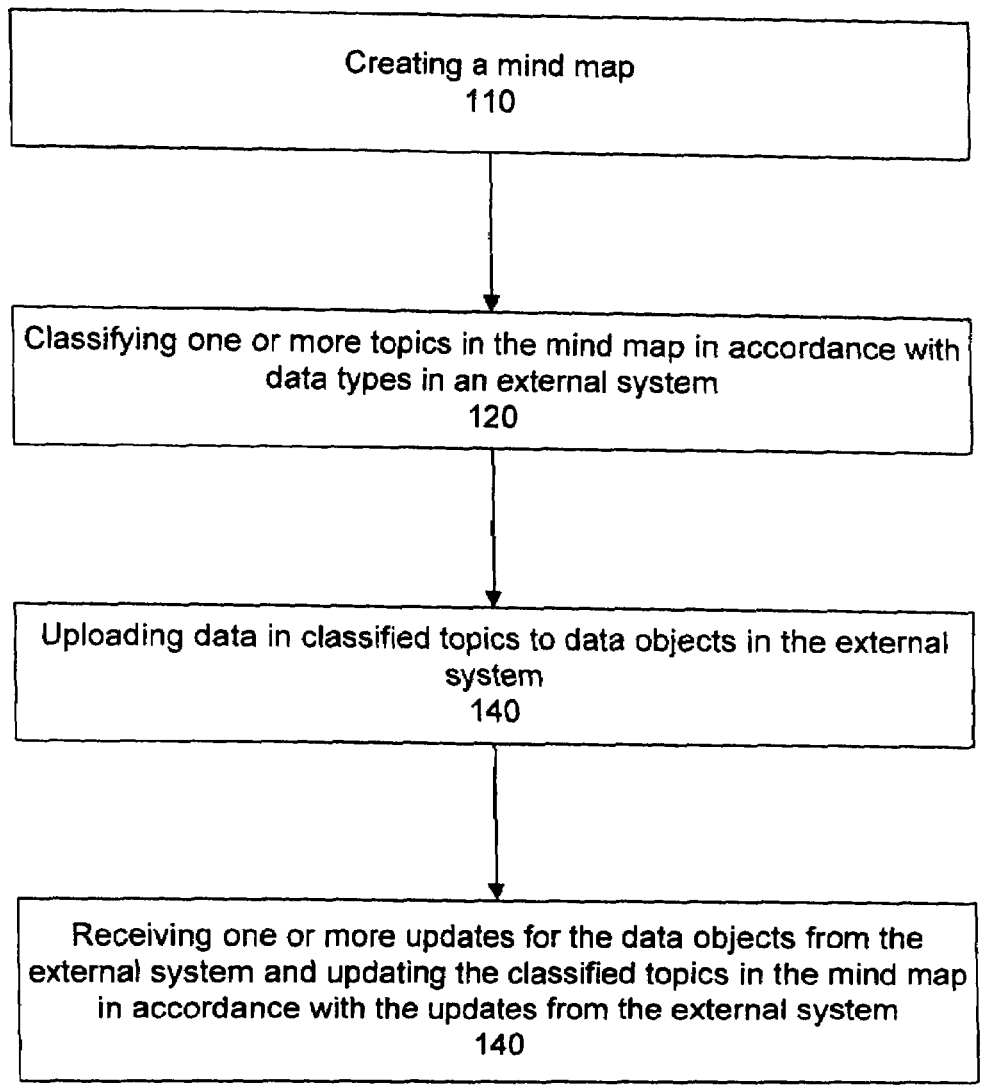
FIG. 1 is a flowchart that illustrates a method for uploading mind map data to an external system and tracking such data via a mind map.

FIG. 1 illustrates a method for uploading mind map data to an external system and tracking such data via a mind map. The method comprises creating a mind map (step 110), classifying one or more topics in the mind map in accordance with data types in the external system (step 120), uploading data in classified topics to data objects in an external system (step 130); and subsequently receiving one or more updates for the data objects from the external system and updating the classified topics in the mind map in accordance with the updates from the external system (step 140).

The mind map may be created manually by a user, or it may be generated by a mind mapping system that queries and formats data from one or more data sources. Topics can be manually classified by the user, or the mind map can be based on a template in which the outline of the map equates to classification categories. The steps of mapping and writing data to an external system are performed by a mind mapping system. In one embodiment, a mind mapping system comprises mind mapping software running on a computer.

The invention is particularly useful in task/project management. Elements of a project or task can be set forth in a mind map during a group meeting, and the data from such mind map can then be automatically uploaded to a task/project management system. A project manager can track the status of the project/task through the mind map by initiating requests to "refresh" the mind map with any changes to the data made in the task/project management system.

Figure 2:
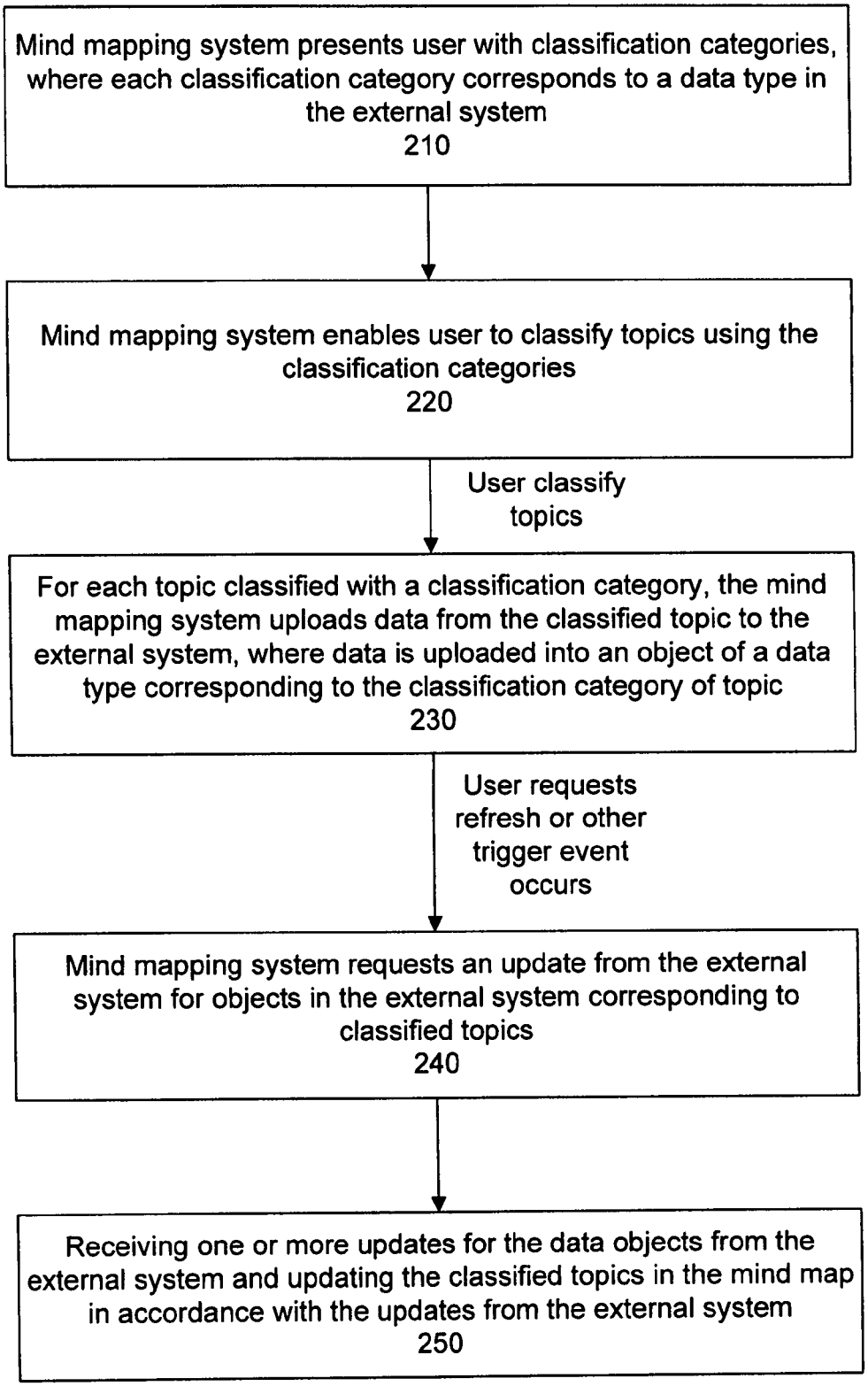
FIG. 2 is a flowchart that that illustrates one way in which a mind mapping system can implement the method of FIG. 1.

FIG. 2 illustrates one way in which a mind mapping system implements the method illustrated in FIG. 1 and enables the user to classify topics. The mind mapping system presents the user with classification categories (step 210). Each classification category corresponds to a data type in the external system. The mind mapping system enables the user to classify one or more topics using the classification categories (step 220). For instance, the mind mapping system may enable a user to classify a topic by tagging a topic with an icon that represents a classification category.

For each topic classified with a classification category, the mind mapping system uploads data from the classified topic to the external system, where the data is uploaded into an object of a data type corresponding to the classification category of the topic (step 230). At a later point (which may be determined by the user or upon the occurrence of a triggering event), the mind mapping system requests an update from the external system for objects in the external system corresponding to classified topics (step 240). In response to receiving updates for such objects from the external system, the mind mapping system updates the data associated with the classified topics (step 250).

Once a topic has been classified and its data uploaded to an external system, subsequent changes to such topic also can be uploaded to the external system. If changes have been made to both the classified topic and the corresponding data object in the external system since the last update was downloaded from the external system, a conflict can occur. In such case, the mind mapping system and/or the external system may employ conflict resolution rules. An example of a conflict resolution rule is allowing changes in an external system to trump changes in mind map and vice versa. Other more complex conflict resolution rules can be implemented, and rules for resolving conflicts between two data sources are well known in the art.

Figure 3A:
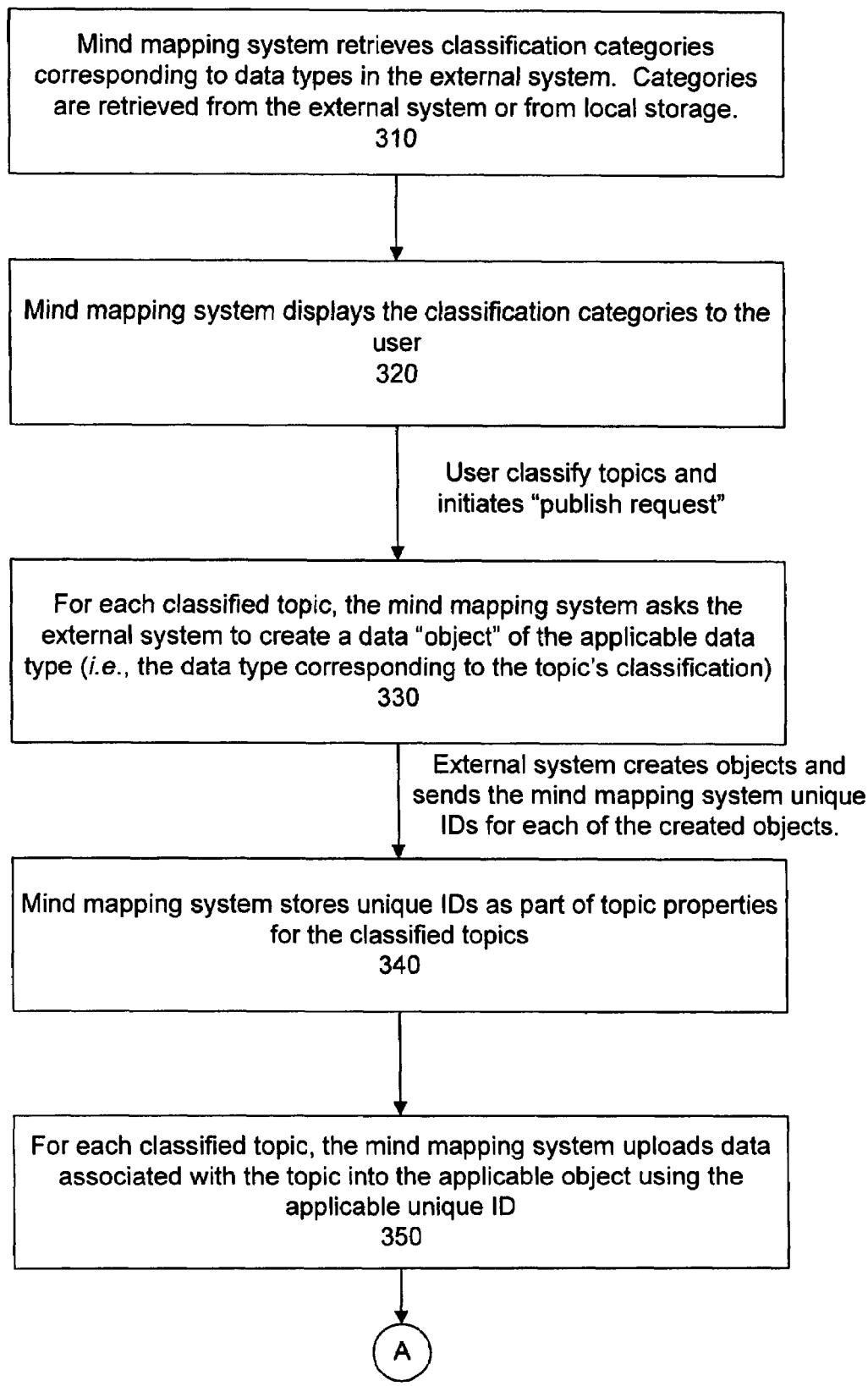
FIG. 3 is a flow chart that illustrates a more detailed, example implementation of the method of FIG. 1.
Figure 3B:
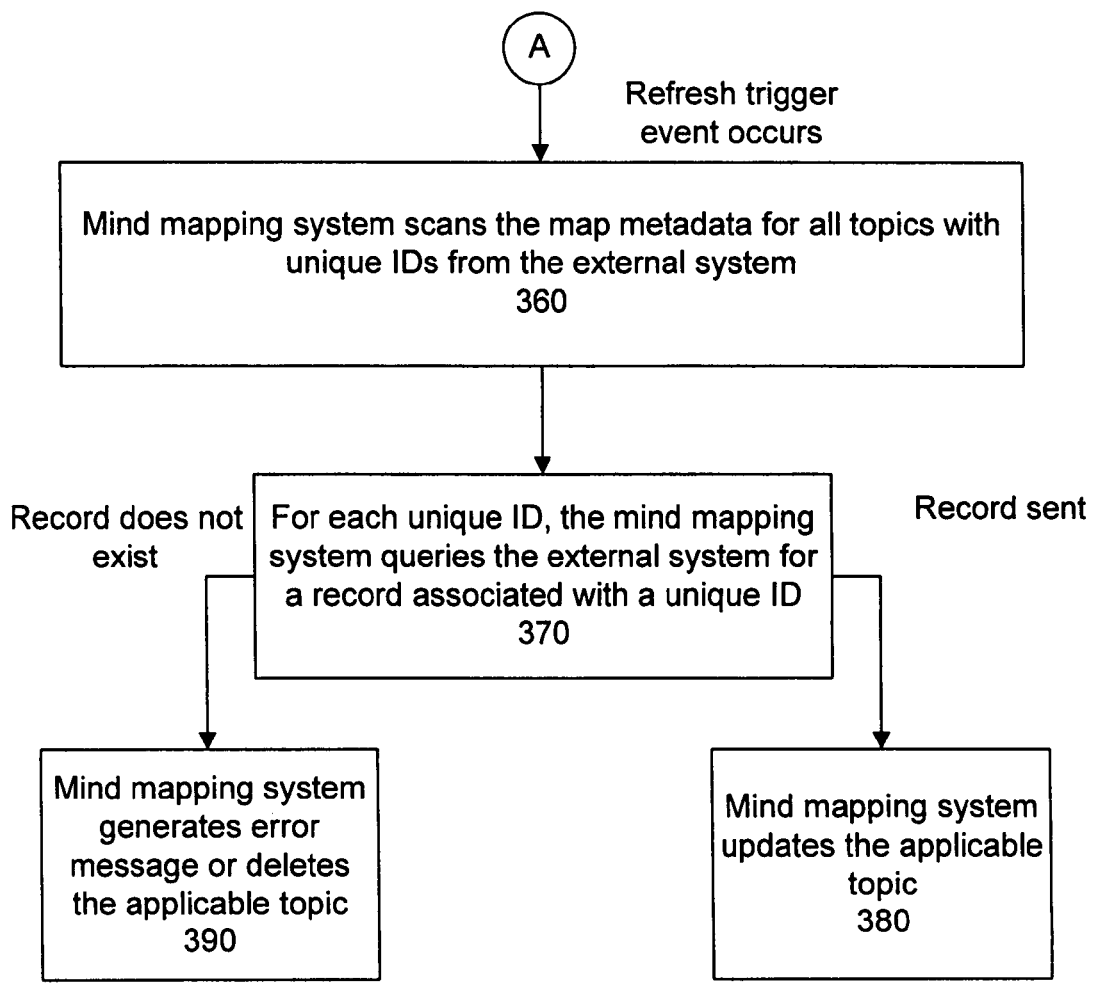

FIGS. 3*a-b* illustrate an example of a more detailed implementation of the method illustrated in FIG. 2. FIGS. 3*a-b* illustrate just one way to implement this method and the invention is no way limited to this implementation.

When the mind mapping system receives a request from user to connect with an external system, the mind mapping system retrieves classification categories corresponding to data types in the external system (step 310). The mind mapping system either requests these classification categories real time from the external system or retrieves them from local storage.

The mind mapping system then displays the classification categories to the user (step 320). Examples of ways in which classification categories can be displayed include displaying the classification categories within a sub-window in the mind mapping system user interface, where the classification categories are listed in text form and/or represented by icons. The hierarchy of the mind map can also represent classifications.

In response to the user classifying topics in accordance with the classification categories and then initiating a "publish request" (i.e., a request to upload the data in the classified topics to the external system), the mind mapping system uploads data to the external system. More specifically, for each classified topic, the mind mapping system asks the external system to create a data "object" of the applicable data type (i.e., the data type corresponding to the topic's classification) (step 330). In one embodiment, such object is an instance of a class for the applicable data type. After the external system creates the requested objects, its sends the mind mapping system a unique ID for each of the objects. The mind mapping system stores the unique IDs as part of the topic properties for the classified topics (step 340). For each classified topic, the mind mapping system uploads data associated with the topic into the applicable object in the external system using the applicable unique ID (step 350).

Data in classified topics is refreshed with updates from the external system upon the occurrence of a refresh trigger event (e.g., user enters a refresh command, certain amount of time passes, mind map is opened again, etc.). When a refresh trigger event occurs, the mind mapping system scans the map metadata for all topics with unique IDs from the external system (step 360). For each unique ID found, the mind mapping system queries the external system for a record associated with the unique ID (step 370). If the external system has a record with the unique ID, it sends the mind mapping system updates for that record, and the mind mapping system updates the applicable topic accordingly (step 380). Otherwise, it informs the mind mapping system that the record does not exist in the external system. The mind mapping system then either generates an error message or deletes the topic corresponding to such unique ID from the mind map (step 390).

Figure 4A:
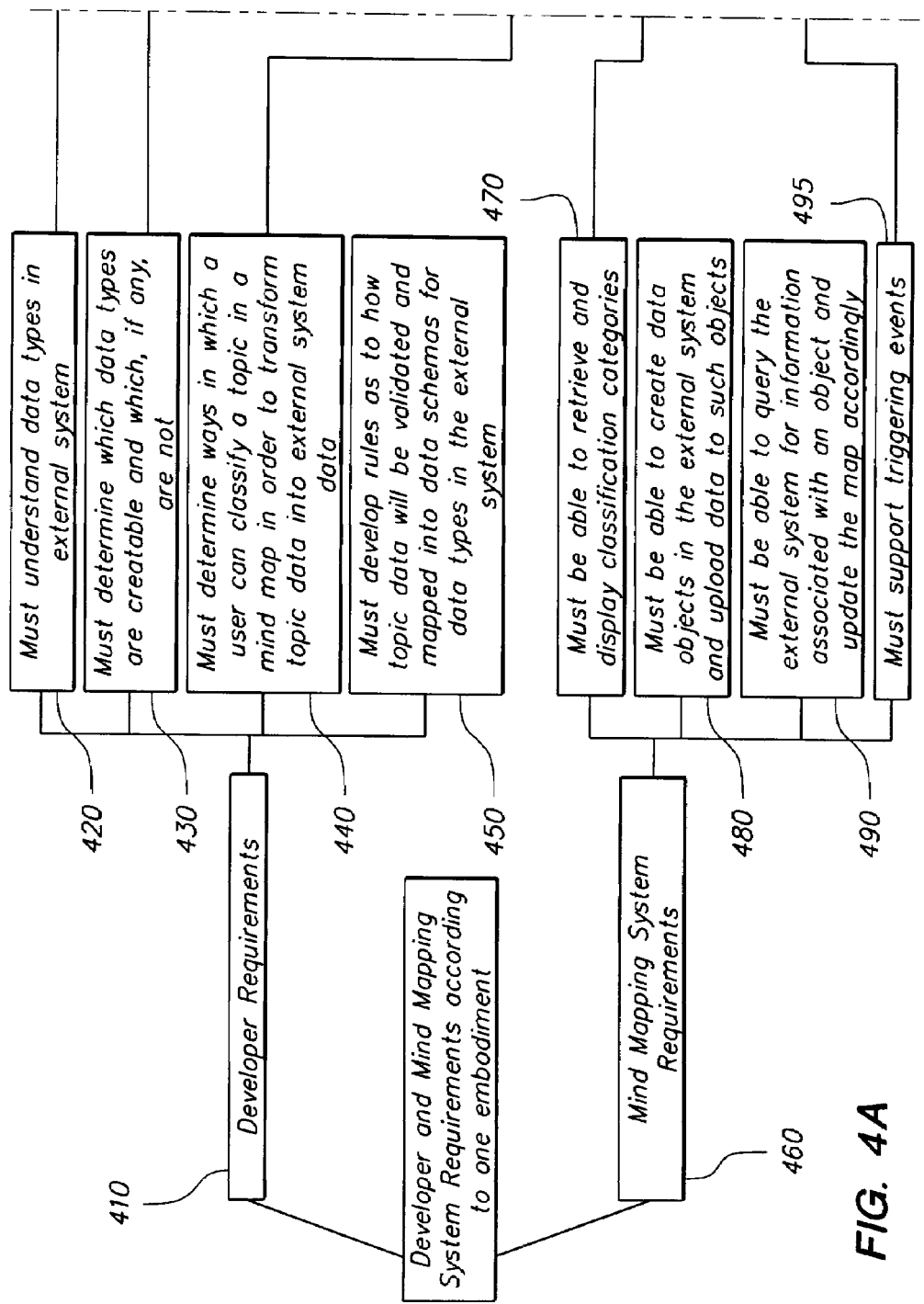
FIG. 4 is a mind map that illustrates an example of developer and mind mapping system requirements to create one embodiment of the invention.

FIG. 4 is a mind map that illustrates developer and mind mapping system requirements to create one embodiment of the above-described methods. These requirements are based on one embodiment of the invention, and the invention is not limited to these requirements. Moreover, FIG. 4 is not intended to be a comprehensive list of all requirements, just the key requirements for this one embodiment.

With respect to developer requirements (410), the developer of the mind mapping system must be able to understand the data types in the external system (420). This means that the data schemas of the data types must be accessible to the developer. Instances of the data types selected by the developer must be uniquely identifiable (such as objects with unique IDs).

The developer (according to one embodiment) also needs to determine which data types are creatable and which, if any, are not creatable (430). For instance, in a project management system, tasks and projects are creatable, but resources (such as people) may be fixed and not-creatable. Creatable data types can be potentially created in a mind mapping system. Non-creatable data types cannot be created in the mind mapping system, but they can be associated with creatable data types (e.g., a particular person can be assigned to a task or a resource can be allocated to a project).

The developer (according to one embodiment) also must determine the way(s) in which a user can classify a topic in a mind map in order to transform topic data into external system data (440). Examples include having an icon or text for each classification category and having the user tag topics with such icons or texts. Other graphical elements of the topic, such as the color or shape can be associated with classification categories. Also, links between topics, as well as the overall hierarchy of the mind map, also can be used to represent classifications.

The developer (according to one embodiment) must also write rules as to how topic data will be validated and mapped into data schemas for data types in the external system (450).

With respect to the requirements for the mind mapping system (according to one embodiment) (460), the mind mapping system must be able to retrieve and display the classification categories (470). The classification categories are just the data types in the external system that can be created or assigned through the mind mapping system. These data types could be stored in local storage associated with the mind mapping system or the mind mapping system could query the external system for the data types.

The mind mapping system (according to one embodiment) must be able to create data objects in the external system and upload data to such objects (480). In one embodiment, the mind mapping system uses rules created by the developer to validate the data in classified topics and map validated data to a data object. The mind mapping system also must be able to query the external system for information associated with an object and modify the map accordingly (step 490).

The mind mapping system (according to one embodiment) must support triggering events to initiate data upload (495). Examples of triggering events are: a user initiated command (e.g., users clicks on "upload" or "refresh" button); time-based events (e.g., every hour); opening map, closing map, call by external system, user makes changes to topic, etc.

Figure 5:
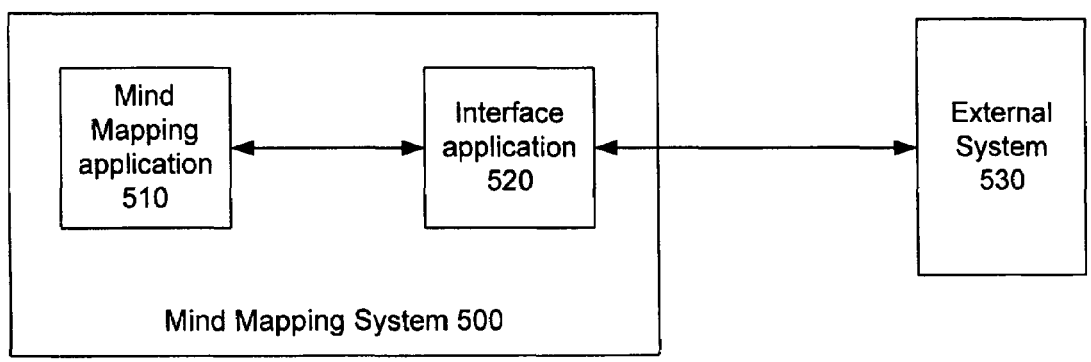
FIG. 5 illustrates a block diagram of a mind mapping system.

FIG. 5 illustrates an example of a mind mapping system 500. The mind mapping system 500 includes a mind mapping application 510 that enables users to create, edit, and save mind maps. Examples of a mind mapping application 510 include Mindjet's MindManager software. The mind mapping system 500 also includes an interface application 520 that interfaces with an external system 530. The interface application 520 performs the uploading and downloading steps described with respect to FIGS. 2 and 3 (including data validation). In an alternate embodiment, the functionality of the interface application 520 is built into the mind mapping application 510.

Figure 6A:
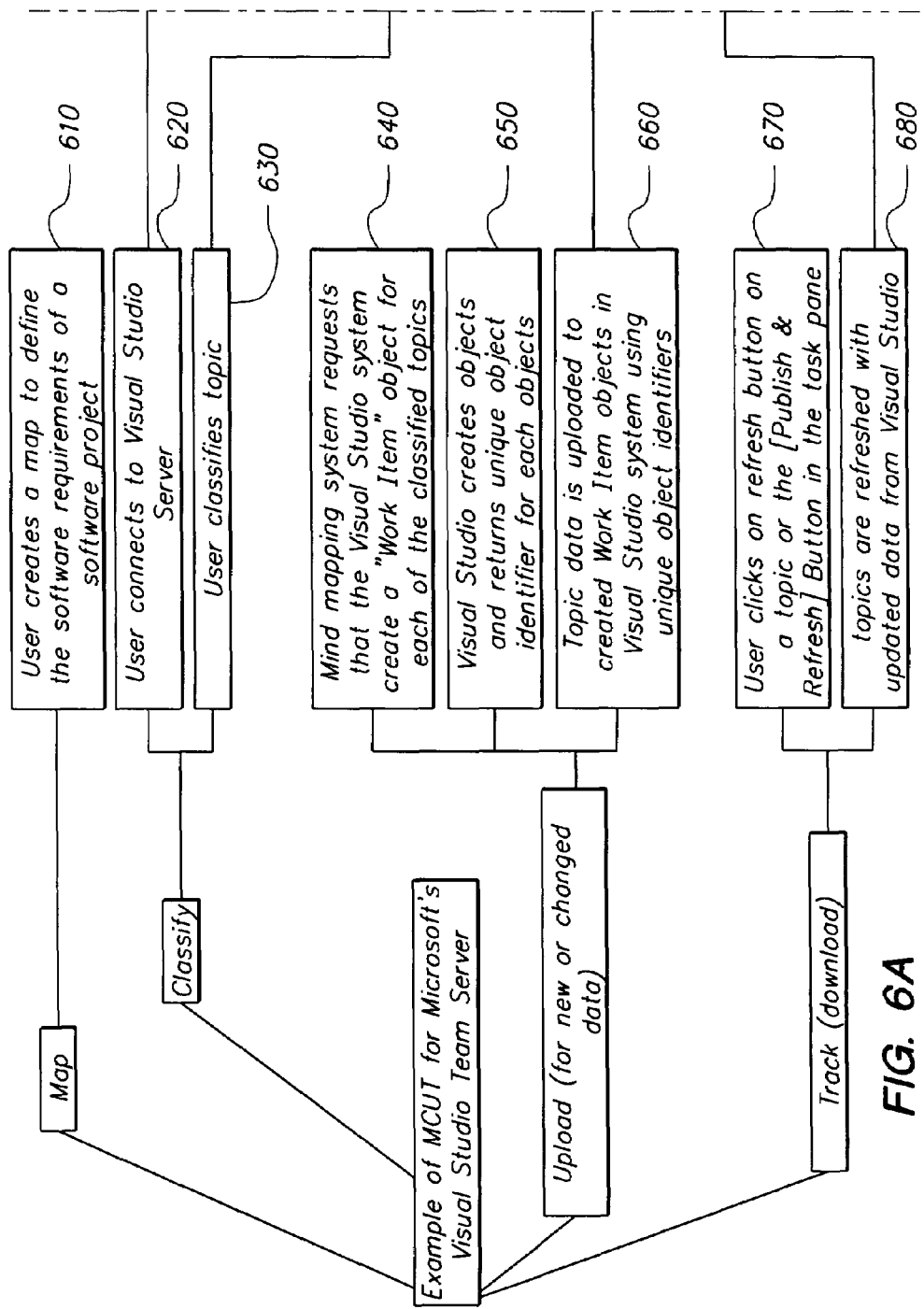
FIG. 6 is a mind map that illustrates an example implementation in which a mind mapping system interfaces with Microsoft's Visual Studio Team Server.

FIGS. 7*a-g* and FIG. 6 illustrate an example implementation the invention in which the mind mapping system interfaces with Microsoft's Visual Studio Team Server Software ("Visual Studio"). Visual Studio includes project management software in which users can create and track "Work Items" for a project. FIG. 6 lists the steps in this example, and FIGS. 7*a-g* illustrate corresponding screen shots.

Figure 7A:
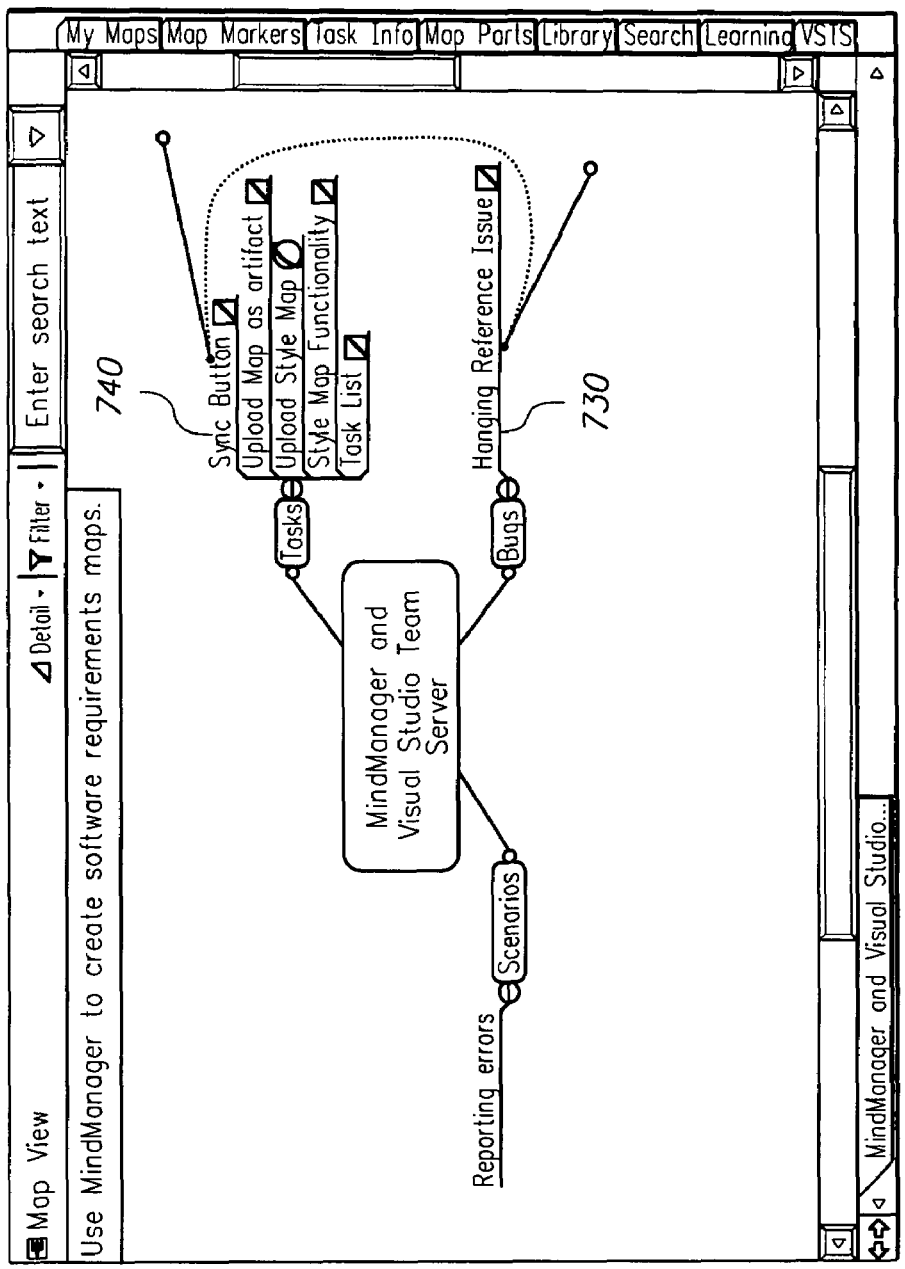
FIGS. 7a-g are screen shots that correspond to the example discussed with respect to FIG. 6.

In this example, the user creates a map that defines the requirements of a software project (step 610; FIG. 7*a*). The project is broken down into tasks, bugs, and scenarios.

Figure 7B:
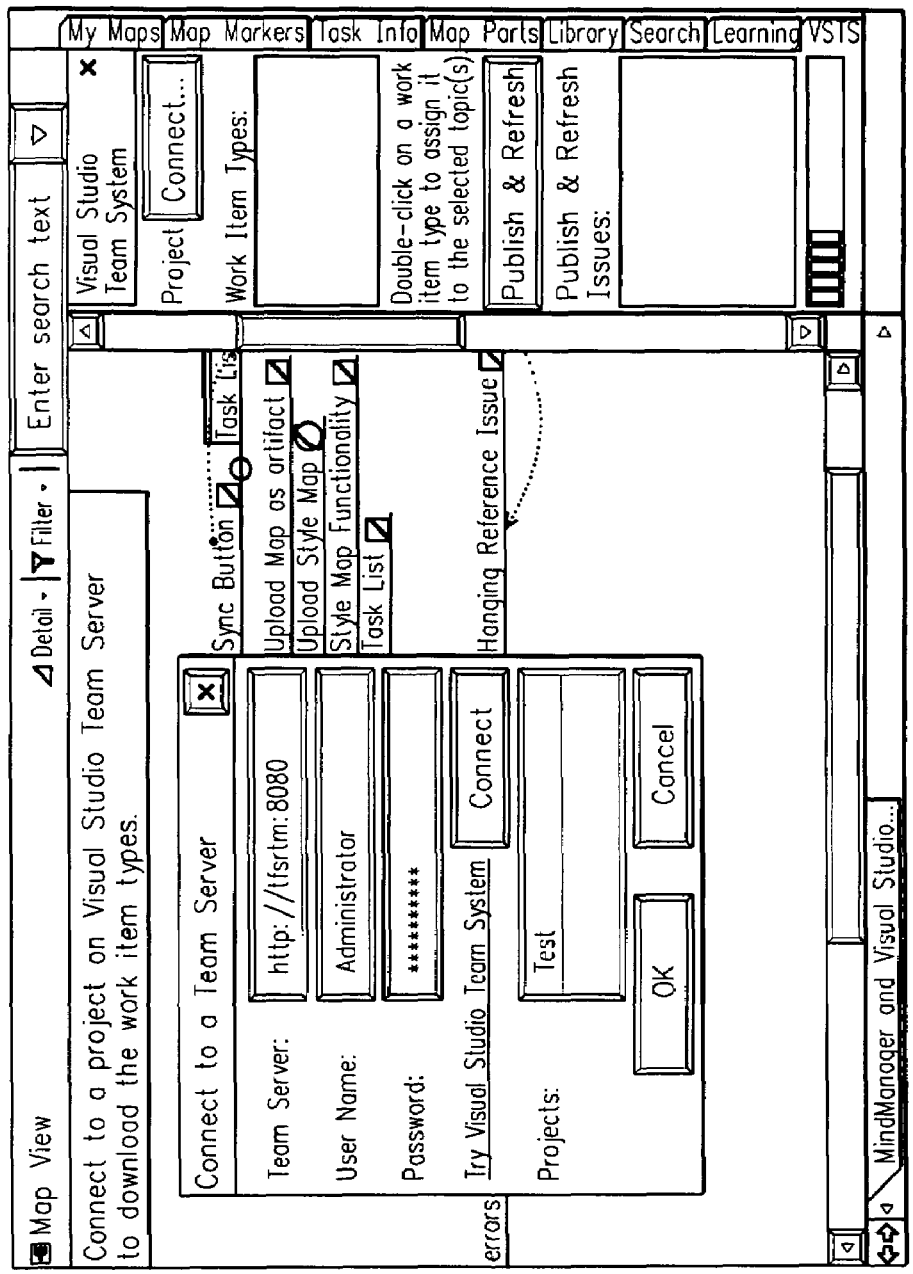
Figure 7C:
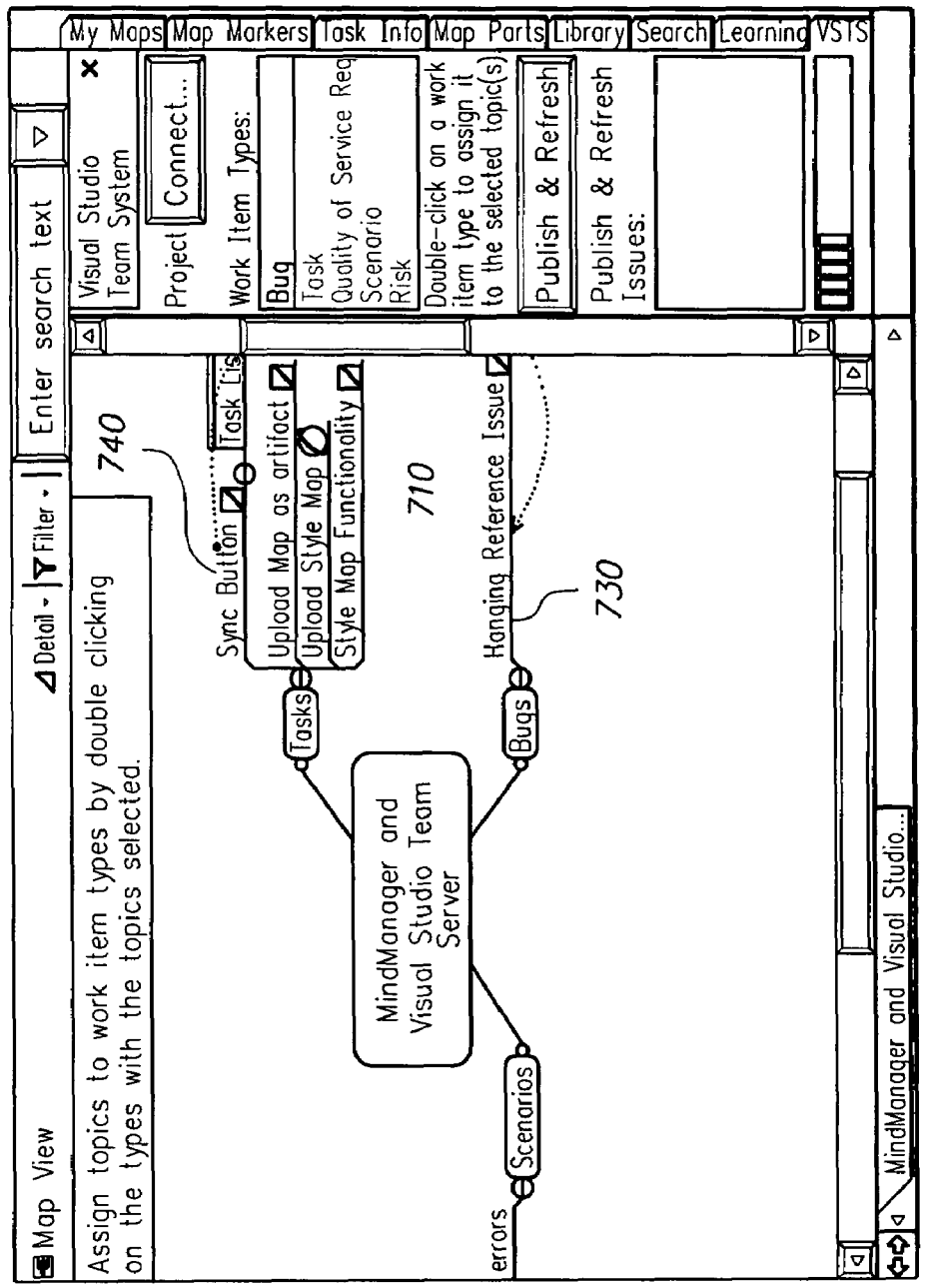
Figure 7D:
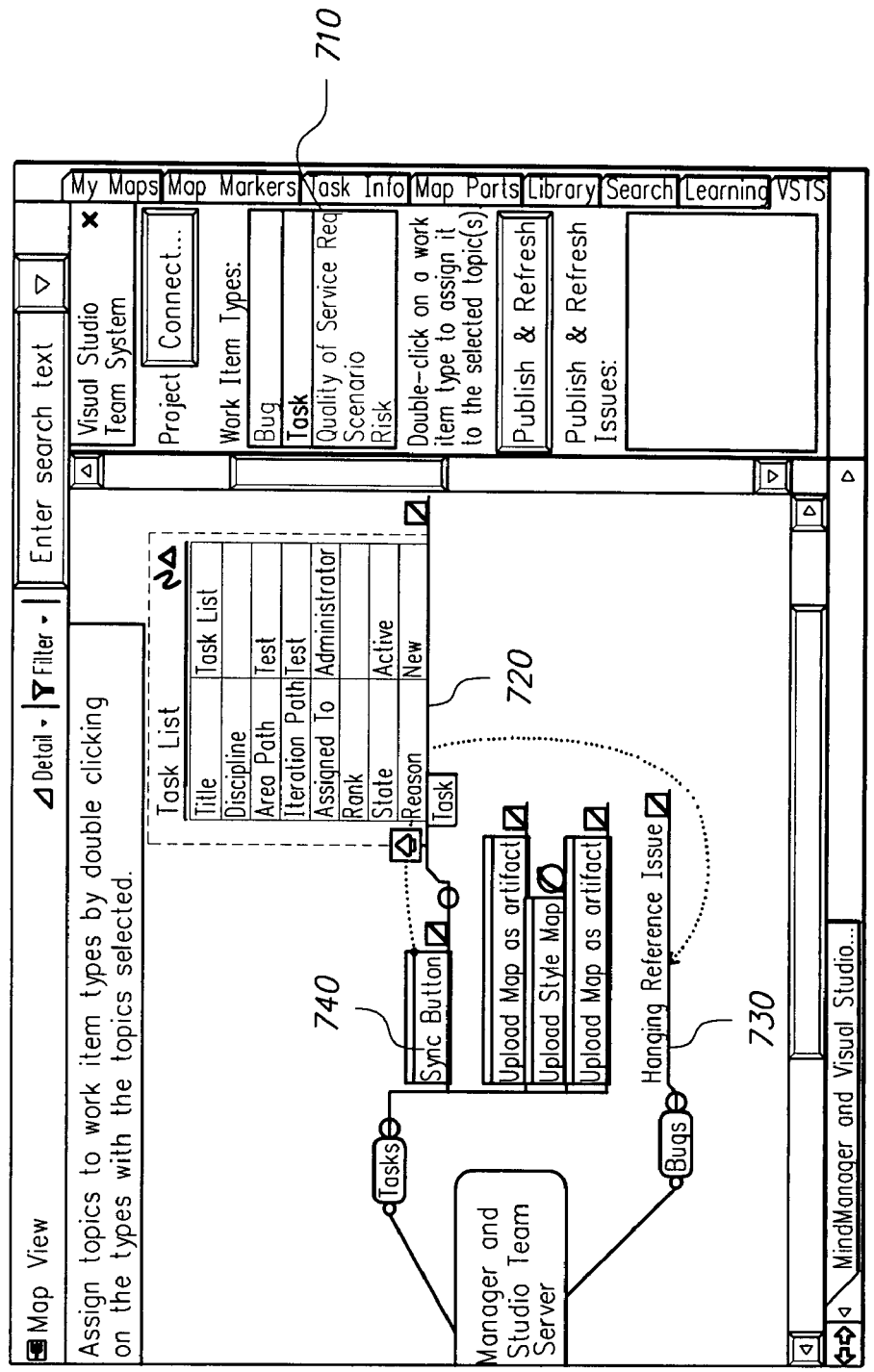

The user then connects to Visual Studio, where the user suppliers the server name, user name, and password and where the user selects "test" as the project type (step 620, FIG. 7*b*). Classification categories for a "test" project are then downloaded from Visual Studio (FIG. 7*c*). These classification categories correspond to "Work Items" in Visual Studio for projects of the type "test." As illustrated in window 710 of FIG. 7*c*, these classification categories are "Bug," "Task," "Quality of Service Requirement," "Scenario," and "Risk."

The user classifies the topics in the mind map in accordance with these classification categories (step 630). In this example, the user classifies a topic by selecting a topic and then double clicking on one of the classification categories. In the example, illustrated in FIG. 7*d*, the user has classified the "Sync Button" topic 740 as a "task" Work Item. When the user does this, a form appears for the user to enter data for the task "Sync Button." In one embodiment, classified topics are implemented as "content-specific topics", which are described in U.S. patent application Ser. No. 11/478,220, titled "System and Method for Providing Content-Specific Topics in a Mind Mapping System," and filed on Jun. 29, 2006, the contents of which are incorporated by reference as if fully disclosed herein.

Figure 7E:
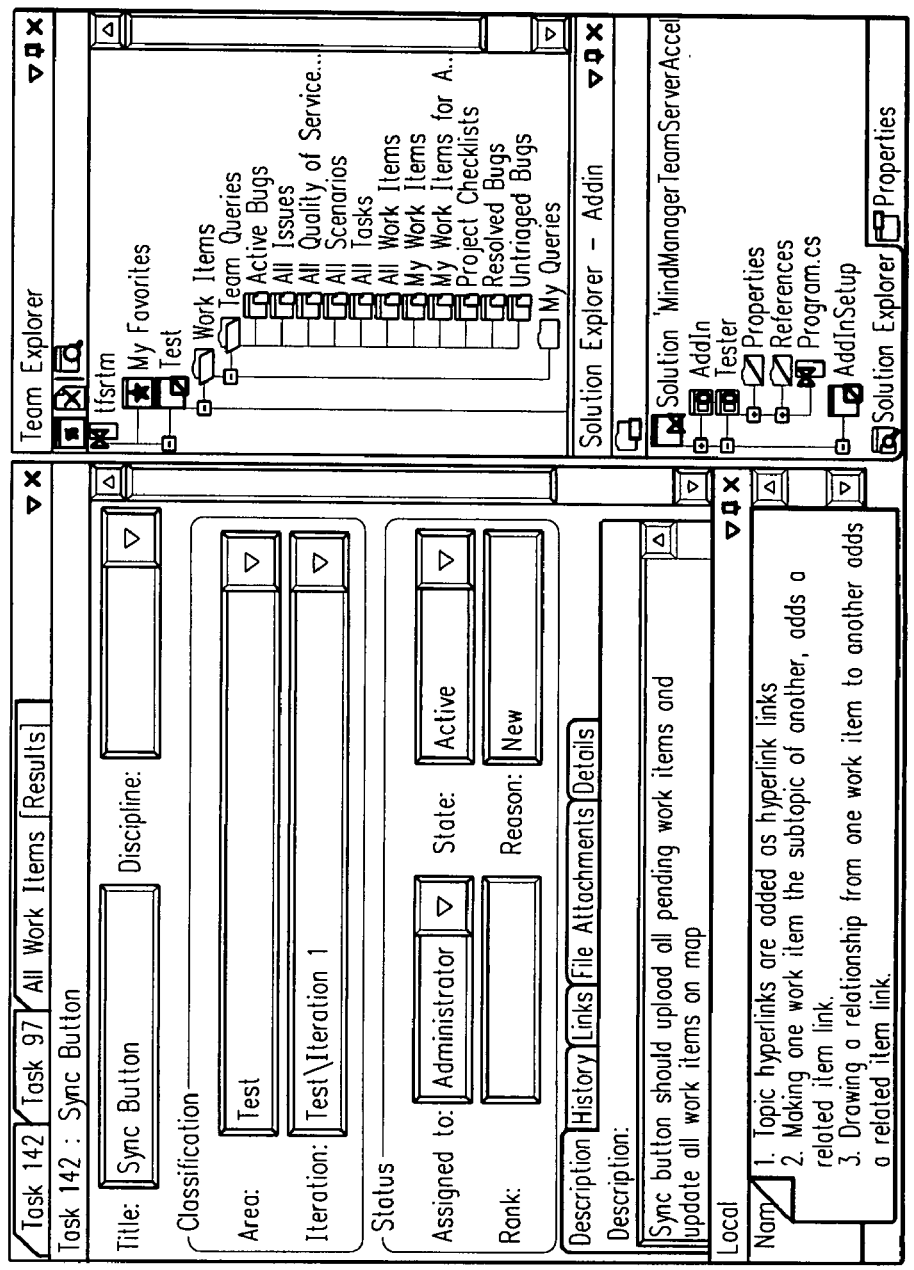

When a user enters a command to upload the classified topics to Visual Studio, the mind mapping system requests that Visual Studio create a "Work Item" object for each of the classified topics (step 640). For instance, the mind mapping system request that Visual Studio create a "Task" Work Item object for the classified "Sync Button" topic 740. Visual Studio then creates the requested objects and sends the mind mapping system a unique ID for each of the created objects (step 650). The mind mapping system then uploads the data to the external system using the unique IDs (step 660). For example, with respect to the "Sync Button" topic 740, the mind mapping system uploads data entered into form 720 (FIG. 7*d*) to Visual Studio with the unique ID for the Task Work Item object created for the Sync Button topic 740. FIG. 7*e* is a screen shot of Visual Studio in which "Sync Button" appears as a "Task" Work Item. The data entered into form 720 in the mind map appears in the Visual Studio interface illustrated in FIG. 7*e*. The data sent from the mind mapping system to Visual Studio is either validated by the mind mapping system and/or Visual Studio.

Figure 7F:
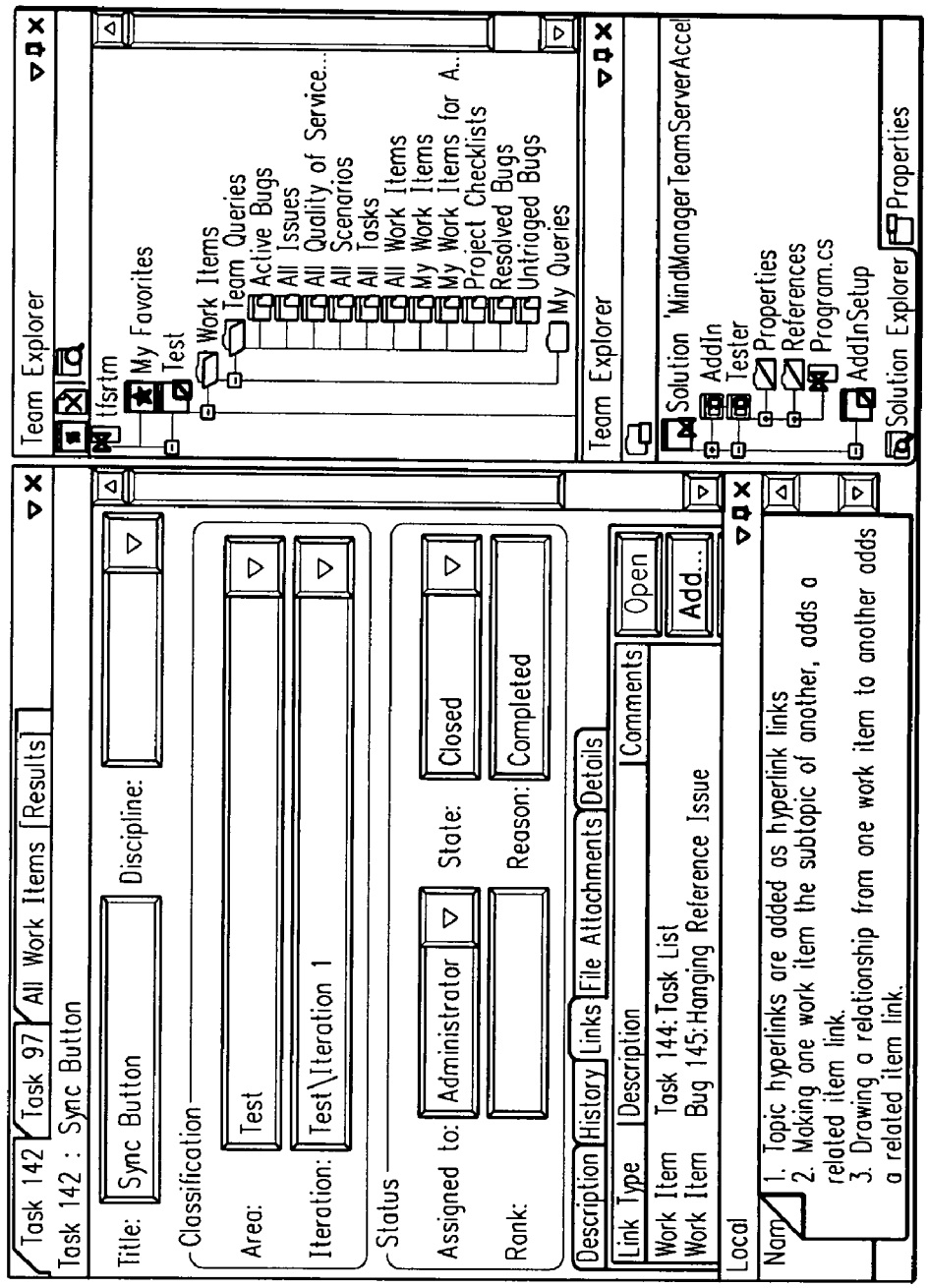
Figure 7G:
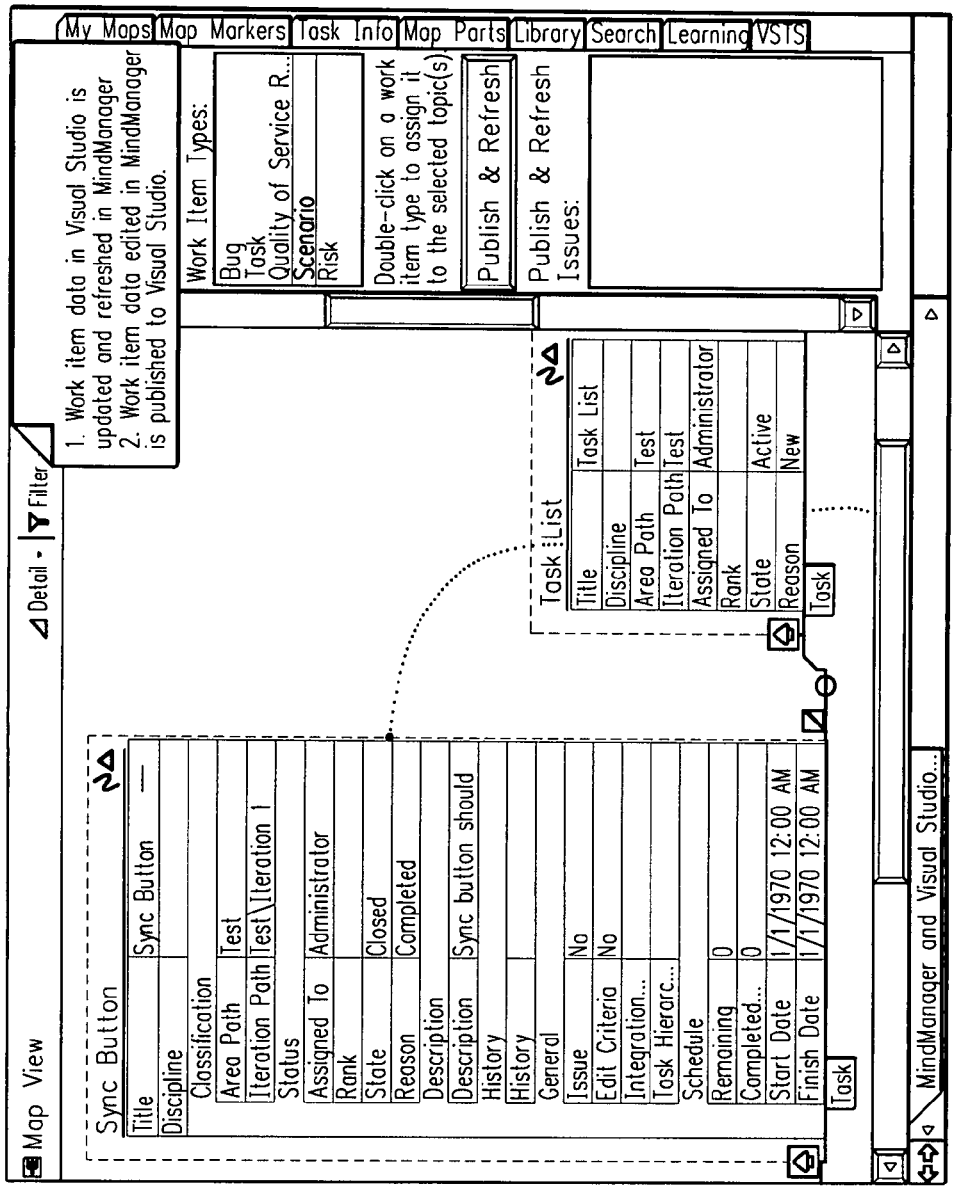
Figure 8:
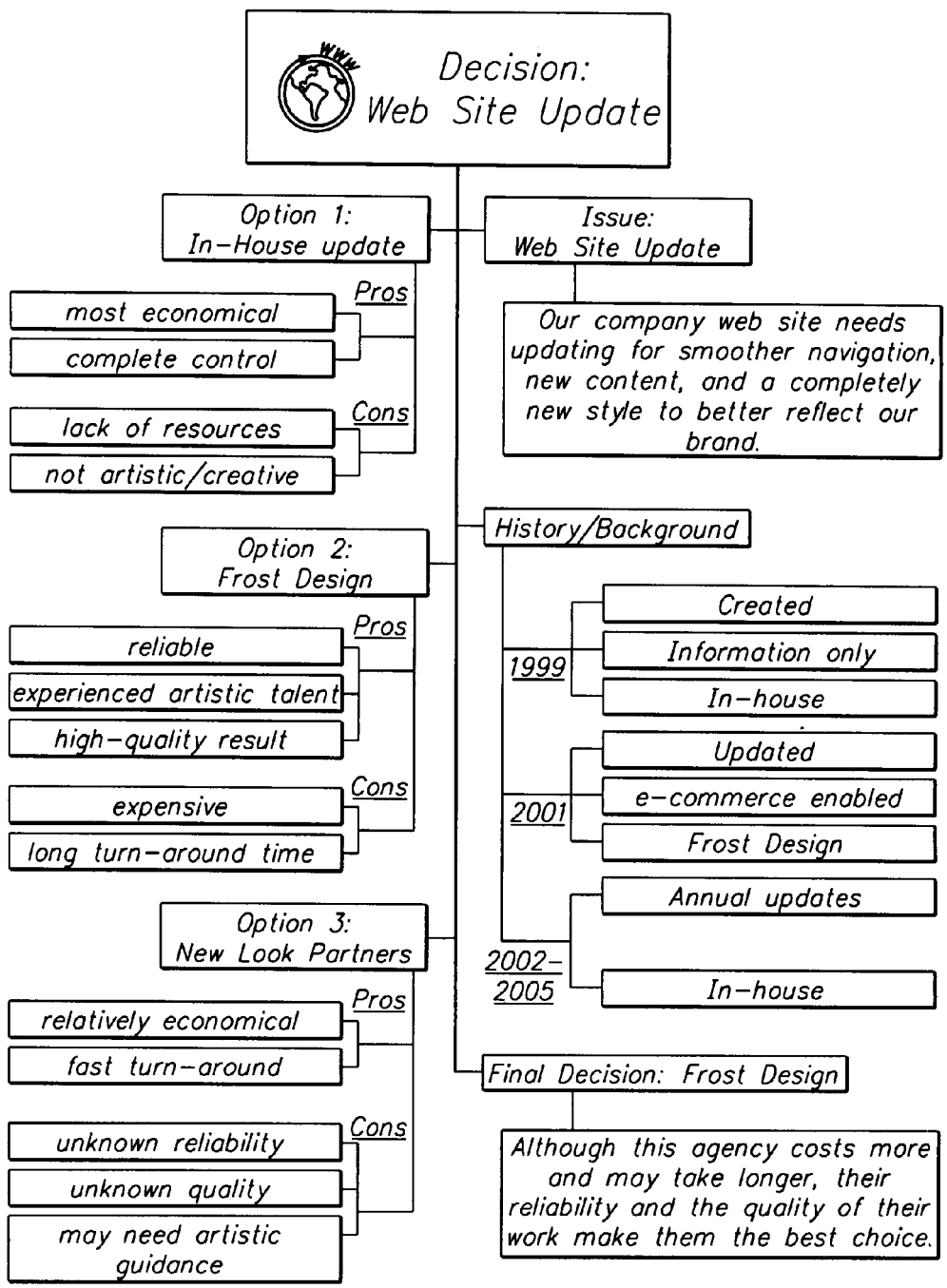
FIG. 8 is an example of a mind map.

In the map illustrated in FIG. 7*a* there is a relationship between the task "Sync Button" and the bug "Hanging Reference Issue" 730 which is formed by the dotted line connecting the topics. In this example, the business rules for mapping classified topics to Visual Studio Work Items specify that a relationship in the mind map translates to a related "Link" in a Work Item. Consequently, as illustrated in FIG. 7*f*, the Hanging Reference Issue bug appears under the "Link" tab of the "Sync Button" Work Item in Visual Studio.

In this example, after work for the Sync Button is complete, someone modifies the "Sync Button" Work Item through Visual Studio to reflect this. Specifically, status is changed from "active" to "closed" and reason is changed from "new" to "complete," as shown in FIG. 7*f*.

When a user of the mind mapping system opens up the mind map for the "test" project at a later point and initiates a refresh command to track the status of the software project (step 670), the mind mapping system queries Visual Studio for updates to Work Items corresponding to the classified topics, including the Sync Button Work Item. The Visual Studio then sends the updates (e.g., the changes to the fields "status" and "reason" in the Sync Button Work Item), and the mind mapping software updates the classified topics accordingly (step 680). The changes to the Sync Button topic 740 are displayed in FIG. 7*g*.

If the mind map user changes the data in an existing classified topic and enters a "refresh" command, these changes are uploaded to Visual Studio. If changes have also been made to the data in Visual Studio since the last update from Visual Studio, the mind mapping system them employs applicable conflict resolution rules to determine whether the changes should be written to the Visual Studio data.

In an alternate embodiment of the invention, when the mind mapping system displays classification categories corresponding to creatable data types, it also displays representations of non-creatable data types (e.g., such as human, machine, and monetary resources for a project). The non-creatable data types can then be linked to classified objects. For instance, in the above example, the mind mapping system could retrieve a list of "software developer" resources from the external system. One of the software developers could then be linked to the "Sync Button" topic 740.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method performed on a computer for creating and tracking external system data via a mind map, the method comprising:
    creating a mind map with topics;
    classifying one or more of the topics in the mind map in accordance with
        classification categories that correspond to data types in the external system; uploading data in classified topics to new data objects in the external system; and receiving one or more updates for the data objects from the external system and
        updating information in classified topics in accordance with such updates.

2. The method of claim 1, wherein the mind map is created by a user.

3. The method of claim 1, wherein the mind map is generated at least in part by a software system.

4. The method of claim 3, wherein the software system obtains data for the mind map by querying and formatting data from one or more data sources.

5. The method of claim 3, wherein the mind map is created through standard templates that include category and workflow outlines.

6. The method of claim 1, wherein a hierarchy of the mind map affects how topics are classified.

7. The method of claim 1, wherein links between two topics can affect how one of such topics is classified.

8. The method of claim 1, where a topic can be classified by a user tagging the topic.

9. The method of claim 8, where the topic can be tagged with a text tag.

10. The method of claim 8, where the topic can be tagged with an icon.

11. The method of claim 1, wherein when a topic is classified, an interface is displayed through which a user can enter additional information details.

12. The method of claim 11, wherein the interface is a form.

13. The method of claim 11, wherein the interface is a property list.

14. The method of claim 11, where the interface is a table.

15. A method performed on a computer for creating and tracking external system data via a mind map, where the mind map is created in a mind mapping system, the method comprising:
    displaying classification categories in a user interface of the mind mapping system, where the classification categories correspond to data types in the external system;
    enabling the user to classify one or more existing topics in the mind map using the classification categories;
    for each topic classified by a user, uploading data associated with the classified topic to the external system, wherein, for a newly classified topic, the data is uploaded into a new data object of a data type corresponding to the classification category of the topic;
    requesting an update from the external system for the data objects corresponding to classified topics; and
    in response to receiving such update from the external system, updating data associated with the classified topics.

16. The method of claim 15 wherein the classification categories are displayed as a text list.

17. The method of claim 15, wherein the classification categories are displayed as icons.

18. The method of claim 15, wherein the user is able to classify a topic by selecting the topic and double clicking on a classification category.

19. The method of claim 15, where a user is able to classify topics by tagging a topic with an icon that represents a classification category.

20. The method of claim 15, wherein uploading data associated with the classified topic comprises:
    sending a request to the external system to create a data object having a data type that corresponds to the classification category of the classified topic;
    receiving a unique ID for such data object from the external system;
    associating the unique ID with the classified topic; and
    uploading data associated with the classified topic to such data object in the external system using the unique ID.

21. The method of claim 20, wherein updating data associated with the classified topic comprises:
    receiving an update from the external system for the data object having the unique ID; and
    updating the classified topic associated with such unique ID in accordance with the update received from the external system.

22. The method of claim 15 wherein requesting an update for data objects associated with classified topics, comprises:
    scanning map metadata for unique IDs associated with the external system; and
    in response to finding a unique ID, sending a request to the external system for an update to the data object having such unique ID.

23. The method of claim 15, wherein a request for updates is sent in response to a trigger event occurring.

24. The method of claim 23, wherein the trigger event is the user entering a command for an update.

25. The method of claim 23, wherein the trigger event is passage of a certain amount of time.

26. The method of claim 23, wherein the trigger event is the user opening the mind map in the mind mapping system.

27. The method of claim 23, wherein the trigger event is the user closing the mind map in the mind mapping system.

28. The method of claim 23, wherein the trigger event is the user editing a topic in the mind mapping system.

29. The method of claim 23, wherein the trigger event is receipt of a message from the external system.

30. The method of claim 15, wherein the external system is a requirements management system.

31. The method of claim 15, wherein the external system is a workflow management system.

32. The method of claim 15, wherein the external management system is a business process modeling system.

33. A computer program embodied on a computer-readable medium and comprising code, that, when executed by a computer, enables the computer to perform a method comprising the following steps:
    displaying classification categories in a user interface of a mind mapping system, where the classification categories correspond to data types in an external system;
    enabling the user to classify one or more existing topics in the mind map using the classification categories;
    for each topic classified by a user, uploading data associated with the classified topic to the external system, wherein, for a newly classified topic, the data is uploaded into a new data object of a data type corresponding to the classification category of the topic;
    requesting an update from the external system for the data objects corresponding to classified topics; and
    in response to receiving such update from the external system, updating data associated with the classified topics.

34. The method of claim 15, wherein the external system is a project management system.

* * * * *